2,966,467

HIGH TEMPERATURE RESISTANT WATER-LEAK DETECTING COMPOSITION

Florence Nesh, 164 Hart St., Brooklyn 6, N.Y.

No Drawing. Filed Mar. 31, 1959, Ser. No. 803,101

8 Claims. (Cl. 252—408)

The invention described herein relates to a chemical formulation for the detection of water leakages at high temperatures and high humidities, and is particularly concerned with an inorganic chemical reaction taking place between lead chloride and silver chromate in the presence of water which reaction results in the formation of a distinctive and permanent coloration.

An object of the invention is to provide a simple and sensitive formulation for detection of water leakages at the sites of said leakages.

Another object is to provide a formulation which produces a permanent indication of the leakage site.

Another object is to provide a formulation which is resistant to temperatures up to 500 degrees Fahrenheit.

Another object is to provide a formulation which indicates a water leakage both at ordinary temperatures and at elevated temperatures.

Another object is to provide a formulation which indicates the site of a water leakage in the presence of 100% relative humidity and is not itself affected by the said humidity.

Another object is to provide a formulation for water leakage indication which is resistant to air oxidation corrosion.

Another object is to provide a water-indicating formulation which can be applied easily as a paint either by brushing or spraying.

Another object is to provide a water-indicating formulation which does not come off on vigorous rubbing but can easily be removed by wire-scraping.

Another object is to provide a formulation consisting of lead chloride and silver chromate which react in the presence of water to form a distinctive coloration which coloration is permanent.

Another object is to provide a formulation consisting of lead chloride and silver chromate dispersed in a vehicle said vehicle comprising a mixture of a Marine Spar Varnish and benzol which enables the formulation to be used as a paint.

Other objects and many of the attendant advantages of this invention will be readily appreciated as the same becomes better understood by reference to the following detailed description.

The invention may be described by the following example of a recommended formulation:

Part 1 Solid—equal parts by weight of silver chromate and lead chloride.

Part 2 Vehicle—one part by volume of a Marine Spar Varnish, which has been previously tested for heat resistivity, and three parts by volume of benzol. Add a sufficient quantity of the vehicle to the solid to make a smooth paint.

This formulation is dark brown in color. It becomes dry to the touch in two hours but should be permitted to air dry for sixteen hours for good leak detection operation. At room temperature a bright yellow spot is formed in contact with water within ten minutes. This is due to the formation of lead chromate by the interaction of the silver chromate with the lead chloride in the presence of the water. At high temperature a white spot is formed instantaneously at the site of the water, which spot is relatively large due to a spreading effect. This white spot is a result of the leaching out of the lead chloride by the hot water. This formulation remains unchanged after being subjected to a temperature of 500 degrees Fahrenheit for 300 hours. This formulation remains unchanged after being subjected to an atmosphere of 100% relative humidity for 300 hours. After being subjected to a temperature of 500 degrees Fahrenheit for 300 hours, the formulation produces a light yellow coloration almost instantaneously upon contact with cold water at room temperature. This formulation is resistant to air oxidation corrosion. This formulation does not come off on vigorous rubbing yet can easily be removed by wire-scraping. The colored spots produced by the reactions described above are permanent.

Obviously many modifications and variations of the present invention are possible in the light of the above teachings. It is therefore to be understood that within the scope of the appended claims the invention may be practiced otherwise than as specifically described.

I claim:

1. A composition for application as a permanent coating to the exterior surface of a container for water, through which surface said water may leak, which composition when applied as a coating and dried will be resistant to high atmospheric humidity to which such coating may be exposed, and which composition when so applied as a coating will clearly indicate the existence and location of any such leak that may subsequently develop, which consists essentially of an anhydrous mixture of lead chloride and silver chromate wherein an amount of silver chromate is used that is sufficient to react with a given amount of lead chloride to form a visible spot in the presence of water dispersed in a liquid vehicle consisting essentially of a varnish diluted with a varnish thinner, that evaporates on exposure to air, in approximate proportions of 1 part varnish to about 3 parts thinner.

2. The composition according to claim 1, wherein said thinner is benzol.

3. The composition according to claim 1, wherein said varnish is a Marine Spar Varnish.

4. The composition according to claim 1, wherein equal parts of silver chromate and lead chloride are used.

5. The composition according to claim 2, wherein said varnish is a Marine Spar Varnish.

6. A composition for use in the preparation of a permanent coating to the exterior surface of a container for water, through which surface said water may leak, which coating will be resistant to high atmospheric humidity and when applied to said container will indicate by a contrasting color spot the existence and location of any leak that may subsequently develop, which consists essentially of an anhydrous mixture of lead chloride and silver chromate wherein an amount of silver chromate is used that is sufficient to react with a given amount of lead chloride to form a visible spot in the presence of water dispersed in a varnish, whereby when said mixture with varnish is diluted with a varnish thinner, that evaporates on exposure to air, in the approximate proportions by volume of about 3 parts thinner for each part varnish in the mixture of varnish, lead chloride and silver chromate, and applied as a coating to said container exterior and dried it will indicate the presence and location of any leak due to penetration of the coating by leaking water.

7. The composition according to claim 6, wherein said varnish is a Marine Spar Varnish.

8. The composition according to claim 6, wherein equal parts of silver chromate and lead chloride are used.

References Cited in the file of this patent

UNITED STATES PATENTS

| | | |
|---|---|---|
| 1,008,434 | Ramage | Nov. 14, 1911 |
| 2,254,609 | Kinzer | Sept. 2, 1941 |
| 2,845,394 | Thompson | July 29, 1958 |